United States Patent
Hubanks et al.

(10) Patent No.: US 7,577,539 B2
(45) Date of Patent: Aug. 18, 2009

(54) SENSOR INTERFACE AND SENSOR CALIBRATION TECHNIQUE

(75) Inventors: David Hubanks, Madison, WI (US);
Eric Joseph Hoffman, Middleton, WI (US); Frank George Cooper, Dix Hills, NY (US)

(73) Assignee: ZMD America Inc., Melville, NY (US)

( * ) Notice: Subject to any disclaimer, the term of this patent is extended or adjusted under 35 U.S.C. 154(b) by 98 days.

(21) Appl. No.: 11/651,172

(22) Filed: Jan. 9, 2007

(65) Prior Publication Data

US 2007/0185673 A1   Aug. 9, 2007

Related U.S. Application Data (60) Provisional application No. 60/758,318, filed on Jan. 12, 2006.

(51) Int. Cl.
*G01F 25/00* (2006.01)
(52) U.S. Cl. .................... 702/104; 324/207.25; 702/91; 702/98
(58) Field of Classification Search ................... 702/85, 702/91, 98, 104; 324/207.21, 207.25, 500
See application file for complete search history.

(56) References Cited

U.S. PATENT DOCUMENTS

| 4,715,003 | A |   | 12/1987 | Keller et al. ................. 364/571 |
| 5,764,541 | A |   | 6/1998 | Hermann et al. ....... 364/571.01 |
| 5,918,194 | A | * | 6/1999 | Banaska et al. ............... 702/91 |
| 6,433,554 | B1 |  | 8/2002 | Kawate et al. .............. 324/500 |
| 7,173,414 | B2 | * | 2/2007 | Ricks et al. ............ 324/207.25 |

FOREIGN PATENT DOCUMENTS

DE          103 47 038        5/2005

* cited by examiner

*Primary Examiner*—John H Le
(74) *Attorney, Agent, or Firm*—Michaelson & Associates; Peter L. Michaelson (57) ABSTRACT

Apparatus and an accompanying method for calibrating a sensor signal conditioner coupled to a sensor. The signal conditioner sensor enables relatively easy and precise calibration of bridge sensors without the use of a microprocessor. When mated to a resistive bridge sensor, the sensor signal conditioner can digitally calibrate offset and gain, with an option to calibrate offset and gain coefficients and linearity over temperature. A second order compensation can be enabled for temperature coefficients of gain, offset or bridge linearity.

20 Claims, 5 Drawing Sheets

SENSOR INTERFACE AND SENSOR CALIBRATION TECHNIQUE

CLAIM TO PRIORITY

This application claims the benefit of our co-pending United States provisional patent application entitled "SENSOR CALIBRATION TECHNIQUE" filed Jan. 12, 2006 and assigned Ser. No. 60/758,318, which is incorporated by reference herein.

BACKGROUND OF THE INVENTION

1. Field of the Invention

The present invention relates to an apparatus and method for calibrating a sensor signal conditioner coupled to a sensor, and more particularly relates to an apparatus and method for calibrating a sensor signal conditioner coupled to a bridge sensor without the use of an on-board microprocessor.

2. Description of the Relevant Art

Bridge circuit sensors are well known in the art, and they are widely used to sense changes, such as changes in pressure or acceleration. A typical bridge circuit sensor includes piezo-resistive elements that are mounted on a substrate, and the stresses induced in the piezo-resistive elements provide an electrical output. The electrical output corresponds to a change in the sensed condition, such as a change in pressure or acceleration. Typical uses for bridge circuit sensors include acceleration sensors for use in automotive braking systems or air bag systems, pressure sensors for use in automotive fuel injection systems or strain sensors. Bridge sensors are also commonly used in building automation systems and consumer white goods or household appliances. There is an ongoing need to reduce the costs associated with these bridge sensors and signal conditioners and to improve the sensitivity of bridge sensors by calibrating them more accurately.

U.S. Pat. No. 5,764,541, entitled "Microprocessor controlled sensor signal conditioning circuit", by Hermann et al. discloses a method and circuit for measurement and signal compensation. The circuit is adapted for connection to a bridge sensor and it includes an analog-to-digital converter having a dual slope integrator. A microprocessor controls the reference voltage applied to the integrator. An amplifier having a switchable gain, controls the amplification of the input signal to the integrator during the various phases of integration. An off-set compensation value is stored in a memory device for providing off-set compensation by charging a capacitor connected to the integrator. A full-scale rough adjust value is also stored on the memory device and is used as a specific reference to produce a reference voltage that is, in turn, used in the integrator during the negative slope phase. During the positive slope phase, the integration time is controlled by means of full-scale fine adjust values. The temperature dependent full-scale fine adjust values are produced from the preprogrammed values in the memory by using interpolation techniques. For example, in the case of a piezo-resistive pressure sensor application, the temperature sensing is undertaken by intermittently sensing the temperature of the measuring circuitry using an on-chip temperature sensor, or the temperature at the top of the sensor bridge using the pressure sensors, or by using external temperature sensors. Pressure measurement depends on the plus and minus outputs of the sensor bridge, and measurement is performed by appropriately adjusting the integrator to provide for temperature compensation during the analog-to-digital conversion process. Other examples of prior art devices and methods are disclosed in U.S. Pat. No. 6,433,554, U.S. Pat. No. 4,715,003 and German Patent DE 10347038.

Using a microprocessor to perform the calibration and compensation of a bridge sensor connected to a sensor signal conditioner presents a number of issues. A microprocessor consumes a relatively large portion of the available silicon real estate on an integrated circuit on which the sensor signal conditioner is disposed. In addition, a microprocessor consumes a relatively large amount of power and generates a relatively large amount of heat. A microprocessor, therefore, increases the size and cost of the sensor signal conditioner and complicates the packaging and cooling of the integrated circuit.

Accordingly, there is a need for sensor signal conditioner that does not utilize an on-board microprocessor to perform the calibration and compensation of the sensor signal conditioner.

SUMMARY OF THE INVENTION

The present invention relates to an apparatus and method for calibrating a sensor signal conditioner which is coupled to a bridge sensor without the use of an on-board microprocessor. The sensor signal conditioner includes an analog-to-digital converter for converting the analog output of the bridge sensor to digital data. An interface circuit, which includes both an analog interface and a digital serial interface, inputs and outputs data to the sensor signal conditioner. A programmable memory stores coefficient data for calibrating the sensor. A state machine controls the flow of digital data from the analog-to-digital converter, and places the sensor signal conditioner into a plurality of modes including at least a normal operation mode and a raw mode. During the raw mode, the output of the sensor is output through the digital serial interface to a calibration host system which calculates calibration coefficients and writes the calibration coefficients to the programmable memory. During the normal mode, calibrated output data is calculated from the calibration coefficients stored in the programmable memory and the calibrated data is output through either the analog interface or the digital serial interface.

DESCRIPTION OF PREFERRED EMBODIMENTS

Figure 1:
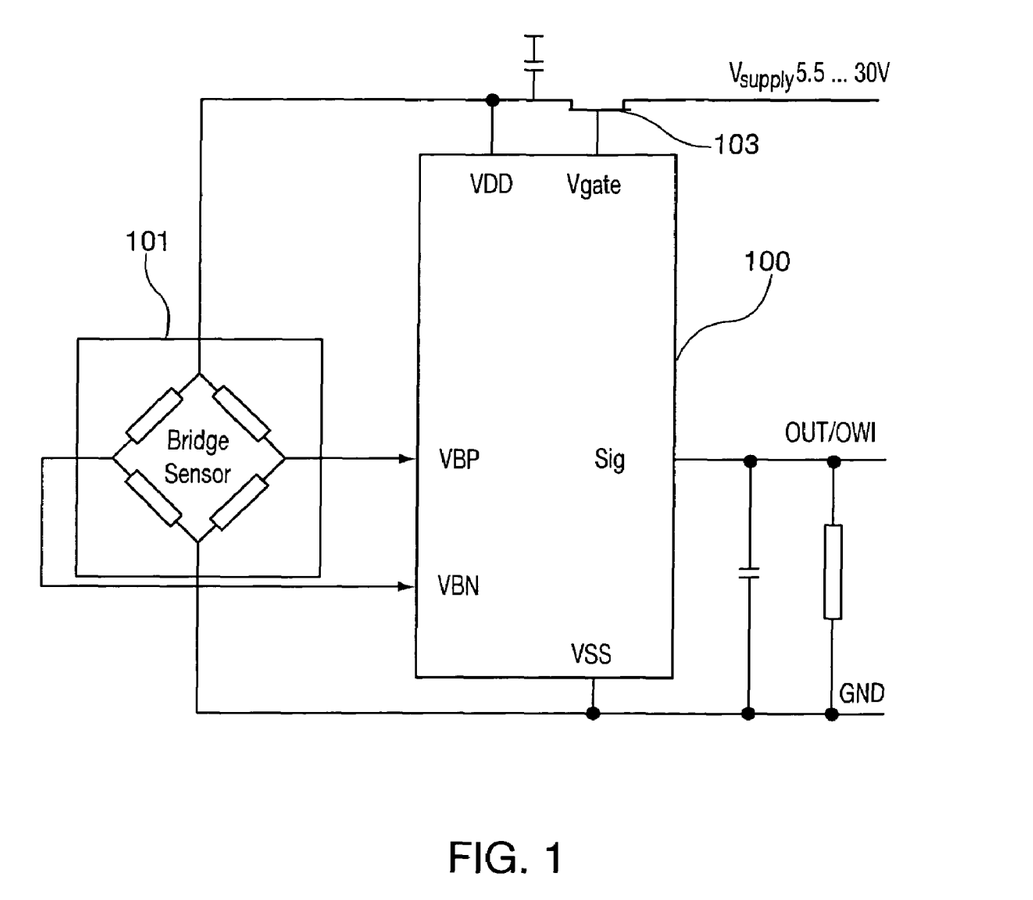
FIG. 1 is a simplified block diagram that illustrates a bridge sensor and a sensor signal conditioner.

Referring now to FIG. 1, a simplified block diagram illustrates a sensor signal conditioner or sensor interface 100 and a bridge sensor 101. The expressions "sensor signal conditioner" and "sensor interface" are used interchangeably herein. The sensor interface 100 of the present invention is particularly well adapted for use as a resistive bridge sensor interface, and it can be used as a cost-effective solution for sensing in building automation, automotive, industrial, office automation and white goods applications. The sensor interface 100 preferably provides three selectable outputs, two analog and one digital, in order to provide versatility across many applications. For example, a ratiometric 5~95% $V_{out}$ signal (0.25~4.75 $V_{out}$@$V_{DD}$=5V) is suitable for most building automation and automotive requirements. Typical office automation and white goods applications require a 0~1$V_{out}$ signal, which may be referenced to an internal bandgap. Direct interfacing to microprocessor controllers is facilitated via a single-wire serial digital interface via an output pin Sig. The sensor interface 100 is preferably capable of running in high-voltage (5.5-30V) systems when it is combined with an external JFET type switching device 103.

The signal conditioner sensor 100 preferably includes a CMOS integrated circuit, which enables relatively easy and precise calibration of resistive bridge sensors via an EEPROM without the use of a microprocessor. The sensor interface preferably communicates via a serial interface to a host computer and is easily mass calibrated in a software environment such as Microsoft's Windows. Once calibrated, the output pin Sig of the sensor interface preferably provides a selectable 0 to 1 V, ratiometric analog output or digital serial output of bridge data, and optionally it can provide both bridge and temperature data.

Figure 2A:
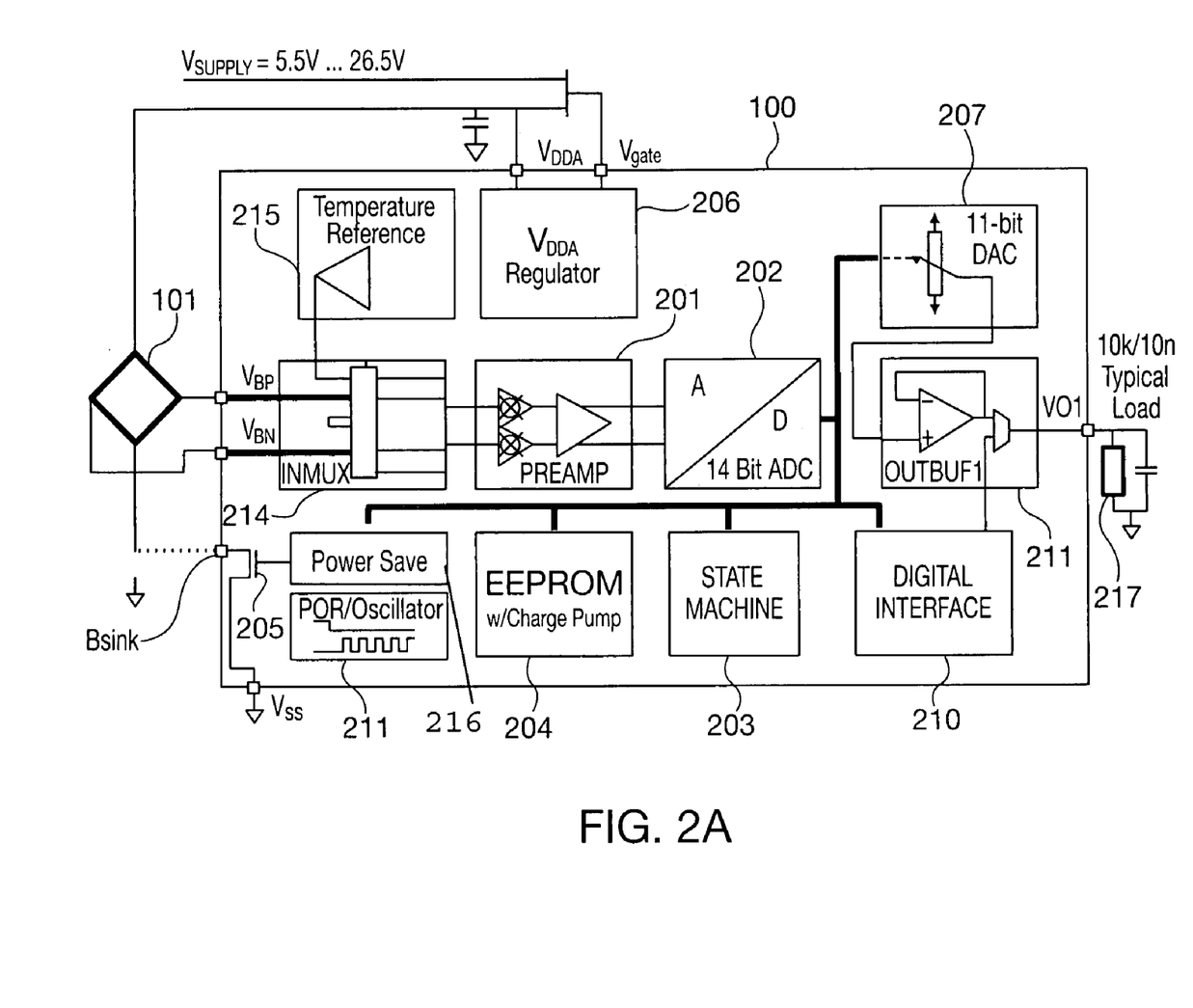
FIG. 2A is a block diagram that illustrates the components of the sensor signal conditioner or sensor interface.

Referring now to FIG. 2A, a block diagram illustrates the components of the sensor interface 100. The sensor interface 100 preferably includes a temperature reference block 215, and the temperature reference output signal is applied to a multiplexer 214. The multiplexer 214 also receives the output signals $V_{BP}$ and $V_{BN}$ from the bridge sensor 101. The sensor interface 100 further preferably includes a pre-amplifier 201 that is coupled to the multiplexer 214 and provides a high precision bandgap with proportional-to-absolute-temperature (PTAT) output. The output of the pre-amplifier 201 is applied, via to a low-power 14-bit analog-to-digital converter ("ADC") 202, an on-chip digital state machine 203 and EEPROM 204 to precisely calibrate the bridge output signal. The bandgap/PTAT of pre-amplifier 201 provides the PTAT signal to the ADC 202, which allows accurate temperature conversion. In addition, an ultra-low ppm bandgap provides a stable voltage reference over temperature for the operation of the rest of the integrated circuit. The PTAT signal is amplified through a path in the pre-amplifier 201 and fed to the ADC 202 for conversion. The most significant 12-bits of this converted result are preferably used for temperature measurement and temperature correction of bridge readings. When temperature is output in a digital mode, however, only the most significant 8-bits are given.

The voltage driven bridge senor 101 is preferably connected to a regulator ($V_{DD}$) 206 and ground. As a power savings feature, the sensor interface 100 also preferably includes a switched transistor 205 to interrupt the bridge current via a pin Bsink. The transistor switching is synchronized to the analog-to-digital conversion and released after finishing the conversion. To utilize this feature, the low supply of the bridge sensor 101 should be connected to an optional sink instead of ground. Depending on the programmable update rate, the average current consumption (including bridge current) can be reduced to approximately 20%, 5% or 1%.

The differential signal from the bridge 101 and the multiplexer 214 is preferably amplified through the pre-amplifier 201 which includes chopper-stabilized instrumentation with very high input impedance designed for low noise and low drift. The pre-amplifier 201 amplifies the differential signal and re-centers its DC level to $V_{DD}$/2. The output of the pre-amplifier block 201 is fed into the analog-to-digital converter 202. The calibration sequence performed by the digital state machine 203 preferably includes an auto-zero sequence to null any drift in the pre-amplifier state over temperature. The pre-amplifier 201 is nominally set to a gain of twenty-four. The inputs to the pre-amplifier 201 from pins VBN or VBP can be reversed via a configuration bit in the EEPROM 204.

The ADC 202 is preferably a 14-bit/1 ms 2nd order charge-balancing analog-to-digital converter which is used to convert signals coming from the pre-amplifier 201. The ADC 202, which is designed using a full differential switched capacitor technique, is used for converting the various signals into the digital domain. Use of this technique offers at least two advantages. The first advantage is high noise immunity because of the differential signal path and the integrating behavior being independent of clock frequency drift and clock jitter. The second advantage is fast conversion time due to the second order mode. Preferably, there are four selectable values for the zero point of the input voltage in order to allow conversion to adapt to the offset parameter of the sensor 100. Together with the reverse input polarity mode, this results in four possible zero point adjustments. The conversion rate varies with the programmed update rate. The fastest conversation rate is 1 k samples/s and the response time is then 1 ms. Based on a best fit, the Integral Nonlinearity (INL) is less than 4 LSB in 14 bit.

The digital state machine 203 is used for processing the converted bridge data as well as performing temperature correction, and computing temperature value for output on the digital channel. The digital state machine 203 reads correction coefficients from EEPROM 204, and can correct for bridge offset, bridge gain, variation of bridge offset over temperature (Tco), variation of bridge gain over temperature (Tcg), and a single second order effect (SOT) (Second Order Term). The EEPROM 204 preferably contains a single SOT that can be applied to correct either the second order behavior of bridge measurement, second order behavior of Tco or the second order behavior of Tcg.

The state machine 203 utilizes converted bridge and temperature data from the ADC 202 and calibrating coefficients from the EEPROM 204. If a SOT applies to correcting the bridge reading then the correction formula for the bridge reading could be represented as a two step process as follows:

$$ZB = GainB \; [1+\Delta T^*Tcg]^*[BR\_Raw+OffsetB+\Delta T^*Tco]$$

$$BR = ZB^*(1.25+SOT^*ZB)$$

Where:
BR=Corrected Bridge reading that is output as digital or analog on the output pin.
ZB=Intermediate result in the calculations.
BR_Raw=Raw Bridge reading from A2D.
T_Raw=Raw Temp reading converted from PTAT signal
$Gain_B$=Bridge gain term
$Offset_B$=Bridge offset term
Tcg=Temperature coefficient gain
Tco=Temperature coefficient offset
$\Delta T$=(T_Raw—TSETL)
T_Raw=Raw Temp reading converted from PTAT signal
$T_{SETL}$=T_Raw reading at which low calibration was performed (typically 25 C)
SOT=Second Order Term If the SOT applies to correcting a 2nd Order behavior of Tco, then the formula for bridge correction could be as follows:

$$BR = GainB\;[1+\Delta T^*Tcg]^*[BR\_Raw+OffsetB+\Delta T (SOT^*\Delta T+Tco)]$$

If the SOT applies to correcting 2nd Order behavior of Tcg then the formula for bridge correction could be as follows:

$$BR = Gain_B[1+\Delta T(SOT*T+Tcg)]*[BR\_Raw+Offset_B + \Delta T*Tco)]$$

The bandgap reference gives a very linear PTAT signal, so temperature correction can always simply be accomplished with a linear gain and offset term.

The Corrected Temp Reading could be as follows:

$$T = Gain_T*[T\_Raw+Offset_T]$$

Where:
T_Raw=Raw Temp reading converted from PTAT signal
Offset$_T$=TempSensor offset coefficient
Gain$_T$=TempSensor gain coefficient The EEPROM 204 preferably contains the calibration coefficients for gain and offset, etc., and the configuration bits, such as output mode, update rate, etc. When programming the EEPROM 204, an internal charge pump voltage is preferably used, thus a high voltage supply is not needed. The charge pump is internally regulated to 12.5 V voltage and the programming time amounts to 6 ms.

The sensor signal conditioner 100 preferably communicates via a one-wire serial interface 210. There are different commands which can be communicated over the one-wire serial interface 210, and these commands could preferably include:
  Reading the conversion result of the ADC (Get BR_Raw, Get T_Raw)
  Calibration Commands
  Entering various test modes, such as DAC test modes; oscillator, 1V, and pre-amplifier testmodes; EEPROM test modes, and oscillator override and scan test modes
  Reading from the EEPROM (dump of entire contents)
  Writing to the EEPROM (trim setting, configuration, and coefficients).

The sensor interface 100 preferably also includes a digital-to-analog converter (output DAC) 207 which is preferably an 11-bit DAC based on sub-ranging resistor strings. The DAC 207 is used for the digital-to-analog output conversion in the analog ratiometric and absolute modes. Selection during calibration configures the system to operate in either of these modes. The design allows for excellent testability as well as low power consumption.

The sensor interface 100 preferably also includes an output buffer 211 that includes a rail-to-rail operational amplifier configured as a unity gain buffer. The output buffer 211 can drive resistive loads (whether pull-up or pull-down) as low as 2.5 km and capacitances up to 15 nF. In addition, to limit the error due to amplifier offset voltage, an error compensation circuit is preferably included which tracks and reduces offset voltage to <1 mV. The output of the output buffer 211 is applied to a load 217.

The sensor signal conditioner 100 uses an absolute reference voltage provided by the bandgap to produce two regulated on-chip voltage references. A 1V reference is used for the output DAC 207 high reference when the part is configured in 0-1V analog output mode. For this reason, the 1V reference must be very accurate and includes trim so that its value can be trimmed within +/-2 mV of 1.00V. The 1V reference is also used as the on-chip reference for the JFET regulator block. Thus the regulation set point of a JFET regulator can be fine tuned using the 1V trim.

The sensor signal conditioner 100 includes a power saving circuit 216 and an oscillator 211. If the power supply exceeds 2.5V (maximum), a reset signal de-asserts and a clock generator starts working at a frequency of approximately 512 kHz (±20%). The exact value only influences the conversion cycle time and communication to the outside world but not the accuracy of signal processing. In addition, to minimize the oscillator error as the $V_{DD}$ voltage changes, the on-chip regulator 206 is used to supply the oscillator block. Trimming of the oscillator 206 is performed at wafer level, and it is advisable that that this not be changed during calibration, since the serial interface may be affected at different oscillator frequencies.

Figure 2B:
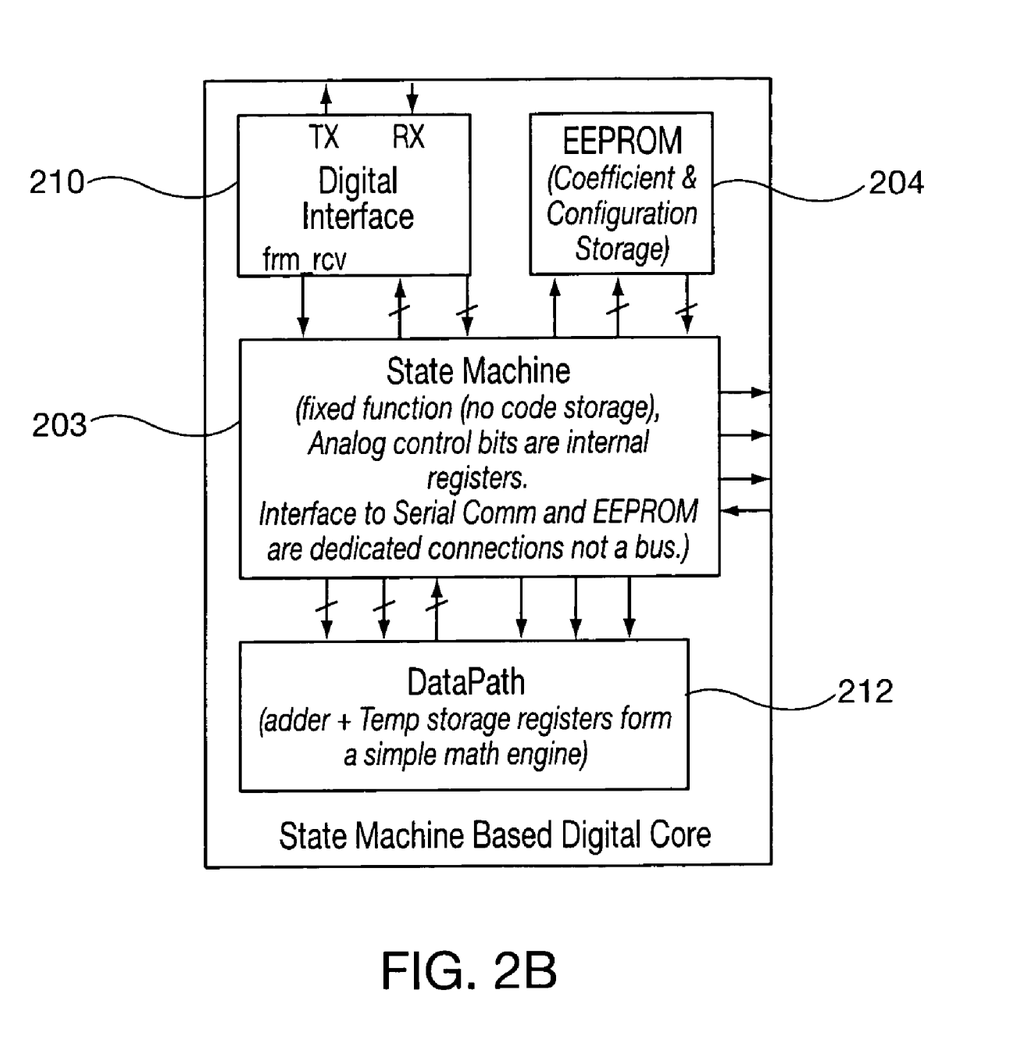
FIG. 2B is a block diagram that illustrates the components of a digital core within the sensor signal conditioner.

Referring now to FIG. 2B, a block diagram illustrates a more detailed view of the state machine 203. The state machine includes fixed functions, but it does not include any code storage. The state machine 203 preferably includes analog control bits which are stored in internal registers. The digital interface 210 includes a serial communication port such as assignee's ZacWire™, I²C, SPI or RS232 ports. Both digital interface 210 and the EEPROM 204 are connected to the state machine 203 via dedicated connections and not by a bus. The EEPROM 204 provides storage for coefficients and configuration data. The state machine 203 is also preferably coupled to a data path 212 which includes an adder and temporary storages registers. The data path 212 provides a relatively simple math engine that enhances the performance of the state machine 203.

Figure 3:
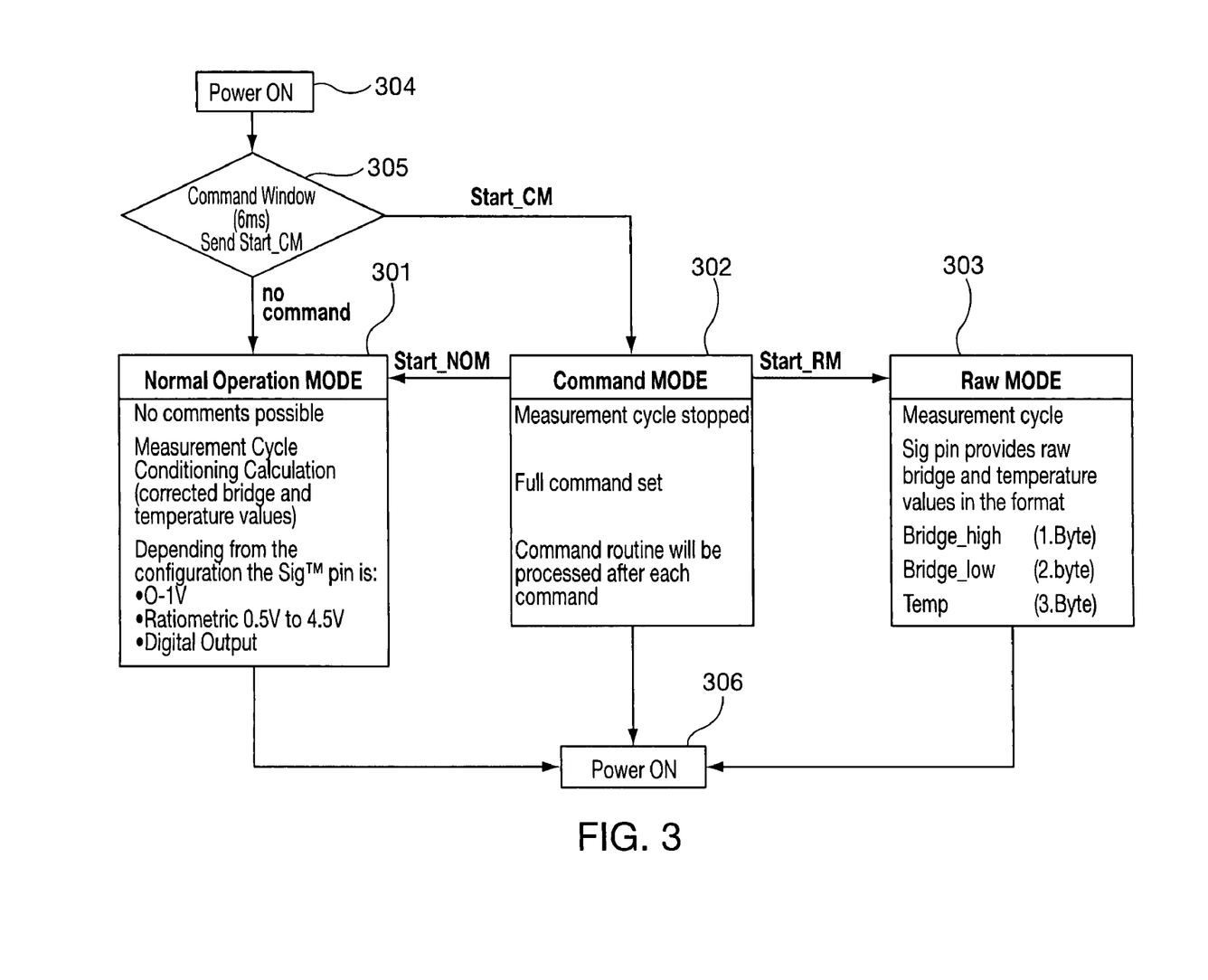
FIG. 3 is a flow diagram illustrating the general method for calibrating the bridge sensor using the sensor signal conditioner of the present invention.

Referring now to FIG. 3, a flow diagram illustrates the three general modes of operation of the sensor signal conditioner 100 which include the normal operation mode 301, command mode 302 and Raw mode 303. In step 304, the power is applied to sensor signal conditioner 100. A command window opens in step 305. After the Power ON of step 304 is performed, the sensor signal conditioner 100 waits for 6 ms(=Command window) for the Start_CM command. If there is no Start_CM command the sensor signal conditioner 100 enters the Normal Operation Mode 301, and dependent upon the contents of EEPROM 204 the bridge raw values will be corrected and the calculated values will appear at the output (analog or digital) of the sensor signal conditioner 100 on pin Sig. The Normal Operation Mode 301 is only used by the end user, but the Command Mode 302 and the Raw Mode are utilized by the system integrator who couples the sensor 101 to the sensor signal conditioner 100.

Any of the modes 301, 302 and 303 can only be entered by a new power ON in step 304. If the sensor signal conditioner 100 receives the Start_CM command during the command window it enters the command mode 302. The Command Mode 302 allows changing in one of the other modes by command. After receiving the command Start_RM the sensor signal conditioner 100 enters the Raw Mode 303 and provides raw bridge and temperature data via the output pin Sig. Without calculation the raw values are transmitted to the digital output in a predefined order. The Raw Mode 303 can only be stopped by Power OFF in step 306. The command/data transfer takes place via the one-wire serial communication protocol of port 210.

Although the sensor signal conditioner 100 can work with many different types of resistive bridges, the calibration process will now be described in connection with a pressure bridge. The calibration procedure essentially involves collecting raw bridge and temperature data from the sensor signal conditioner 100 for different known pressures and temperatures. This raw data can then be "crunched" by a calibration host or master, for example a personal computer, and the calculated coefficients can then be written to the EEPROM 204 of the sensor signal conditioner 100.

Figure 4:
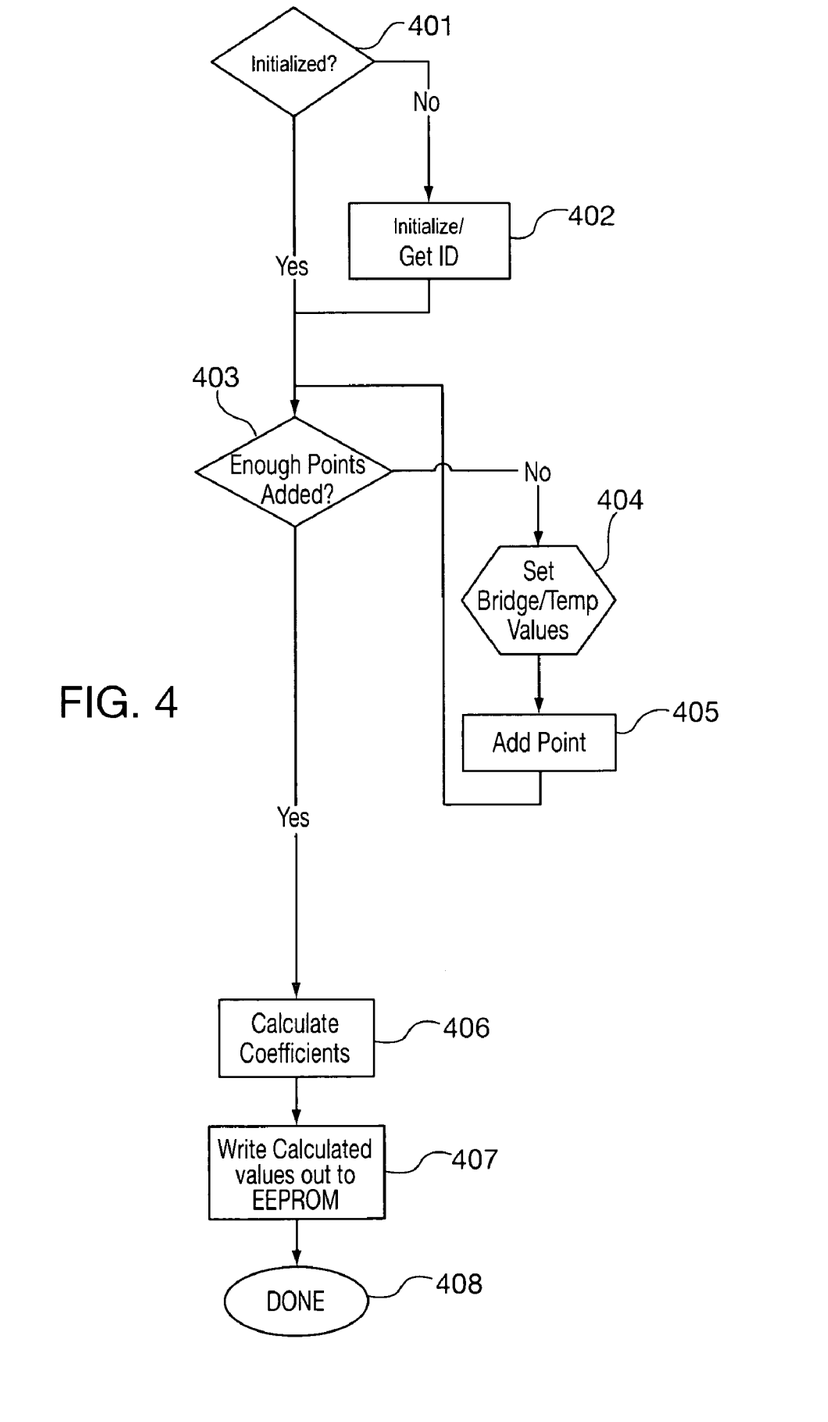
FIG. 4. is a flow diagram that illustrates the main steps of the calibration method.

Referring now to FIG. 4, a flow chart illustrates the steps for calibrating the sensor signal conditioner 100. There are three main steps to the calibration process. In the first main step, the sensor signal conditioner is initialized in step 401 and a unique identification is assigned to the signal sensor conditioner 100 in step 402. This identification is programmed in EEPROM 204 and can be used as an index into the database stored on the calibration PC. This database will contain all the raw values of bridge readings and temperature reading for that part, as well as the known pressure and temperature the bridge was exposed to. This unique identification can be stored in a combination of the following EEPROM registers $T_{SETL}$, Tcg,Tco. These registers will be overwritten at the end of the calibration process, so this unique identification is not a permanent serial number.

The second main step includes data collection, and the data collection is performed if it is determined in step 403 that the sensor signal conditioner 100 does not have enough data points. If there are not enough data points, then the bridge/temperature values are set in step 404, and the data points are added in step 405.

The number of different unique (pressure, temperature) points that calibration needs to be performed at depends on the end user's needs. The minimum is a 2-point calibration, and the maximum is a 5-point calibration. To acquire raw data from the sensor 101 one has to cause the sensor signal conditioner 100 to enter raw mode 303. This is done by issuing a Start_CM command to the sensor signal conditioner 100 followed by a Start_RM command with the LSB of the upper data nibble set. When in the Raw Mode 303 the sensor signal conditioner 100 outputs raw data on the output pin Sig of the serial wire interface 210 instead of corrected bridge and temperature data. The raw data is sent to the calibration host which is preferably a personal computer. Depending upon the communication protocol utilized by the calibration host system, it may be necessary to introduce a translator board between signal sensor conditioner 100 and the calibration host system. For example, it may be necessary to for the translator board to translate ZACwire™ protocol data from the sensor signal conditioner 100 to RS232 protocol data that can be inputted to the calibration host system and vice versa. The translator board could also include an artificial bridge stimulus that generates a simulated bridge sensor signal. The simulated bridge sensor signal would enable the calibration host system to provide the sensor signal conditioner 100 with calibration data without an actual bridge sensor being coupled to the sensor signal conditioner 100.

The calibration host system grabs several of these data points (sixteen points of bridge and temperature data are recommended) and averages them. These raw bridge and temperature settings are stored in the database of the calibration host system along with the known pressure and temperature. The output format during raw mode is Bridge_High, Bridge_Low, Temp. Each of these are preferably 8-bit quantities. The upper 2-bits of Bridge_High are zero filled. The Temp data (8-bits only) probably does not contain enough information for highly accurate temperature calibration. Therefore, the upper three bits of temperature information are not given, but assumed to be known. Therefore, effectively 11-bits of temperature information is preferably provided in this mode.

After enough data points have been collected to calculate all the desired coefficients, then in step 406 the coefficients can be calculated by the calibrating PC and written to the sensor signal conditioner 100 in step 407. Data collection involves getting raw data from the bridge at different known pressures and temperatures. This data is then stored on the calibration PC using the unique identification of the sensor signal conditioner 100 as the index to the database. Those skilled in the art know how to make these calibration calculations.

The number of calibration points can be as few as two or as high as five. This depends on the precision desired, and the behavior of the resistive bridge in use. For example, a 2-point calibration would be used if one simply wanted a gain and offset term for a bridge with no temperature compensation for either term. A 3-point calibration would be used if one wanted to have 1st order compensation for either a Tco or Tcg term but not both. A 3-point calibration could also be used if one wanted 2nd order correction for the bridge, but no temperature compensation of the bridge output. A 4-point calibration would be used if one wanted 1st order compensation for both Tco and Tcg. A 4-point calibration could also be used if one wanted 1st order compensation for either Tco or Tcg but not both, and wanted 2nd order correction for the bridge measurement. 5-point calibration would be used if one wanted both 1st order Tco correction and 1st order Tcg correction, plus a 2nd order correction that could be applied to one and only one of the following: 2nd order Tco, 2nd order Tcg, or 2nd order bridge.

One of the primary advantages of the present invention over the prior art is the use of the state machine 203 instead of a microprocessor to control the sensor signal conditioner 100. A state machine which is also sometimes called a "finite state machine" is a computing device designed with the operational states required to solve a specific problem. State machines are typically minimized, specialized and optimized for a particular application, and can provide faster performance at lower cost than a general-purpose microprocessor.

Unlike the prior art microprocessor controlled sensor signal conditioner, the sensor signal conditioner 100 of the present application requires no ROM to store program code, and the state machine 203 executes a fixed function and does not execute general purpose instructions. The state machine 203 follows a prescribed set of operations, thereby eliminating the need for a program code block. Moreover, unlike a microprocessor controlled device, the disclosed sensor signal conditioner 100 does not require a register file or general purpose register file (scratch pad). Instead, only a few temporary registers are needed, and they are included in the data path block 212.

The state machine 203 of the present application is smaller in size, utilizes less power and produces less heat than a microprocessor. Accordingly, a state machine implementation may be as much as 45% smaller than a microprocessor implementation. The state machine 203 may draw as little as 10-15 µA. An equivalent microprocessor controlled device may draw as much as 400-550 µA. Moreover, the lower voltage capabilities of the present invention provide a distinct advantage of over a microprocessor controlled device in which the ROM and the register file of the microprocessor are usually the first to malfunction at low power supply voltages. The state machine 203 the present application eliminates these failure prone components. Accordingly, the state machine 203 of the present application provides distinct advantages over the prior art.

The invention has been described with reference to exemplary embodiments. However, it will be readily apparent to those skilled in the art that it is possible to embody the invention in specific forms other than those of the embodiments described above. This may be done without departing from the sprit of the invention. The exemplary embodiments are merely illustrative and should not be considered restrictive in any way. The scope of the invention is given by the appended claims, rather than the preceding description, and all variations and equivalents which fall within the range of the claims are intended to be embraced therein.

We claim:

1. A sensor signal conditioner, for a sensor having a predetermined sensing function, comprising:
   an analog-to-digital converter for converting the analog output of the sensor to digital data;
   a state machine, coupled to the analog-to-digital converter, for controlling the flow of digital data from the analog-to-digital converter, and for placing the sensor signal conditioner into a plurality of different modes having a normal operation mode and a raw mode, wherein the state machine comprises a math engine having an adder and a plurality of temporary storage registers;
   an interface circuit including both an analog interface and a digital serial interface, responsive to the state machine, for inputting and outputting data to the sensor signal conditioner; and
   a programmable memory, responsive to the state machine, for storing coefficient data for calibrating the sensor; and wherein:
       during the raw mode the state machine causes the output of the sensor to be output through the digital serial interface to a calibration host system which calculates calibration coefficients and writes the calibration coefficients to the programmable memory; and
       during the normal mode the state machine calculates calibrated output data from the calibration coefficients stored in the programmable memory and causes the calibrated data to be output through either the analog interface or the digital serial interface.

2. The sensor signal conditioner according to claim 1 which receives input from a bridge circuit sensor and the sensor signal conditioner provides data which is calibrated for at least one of bridge offset, bridge gain, variation of bridge offset over temperature, variation of bridge gain over temperature or a second order effect.

3. The sensor signal conditioner according to claim 2 which further includes a temperature circuit for providing temperature data to the analog-to-digital converter, and wherein the signal sensor conditioner provides data which is calibrated for values related to both the bridge sensor and temperature.

4. The sensor signal conditioner according to claim 3 wherein the bridge sensor senses at least one of pressure, acceleration, strain or temperature.

5. The sensor signal conditioner according to claim 3 wherein the sensor signal conditioner further includes a multiplexer and a pre-amplifier for inputting both temperature data and sensor data to the analog-to-digital converter.

6. The sensor signal conditioner according to claim 5 wherein the interface circuit includes a digital-to-analog converter and output buffer which permits the sensor signal conditioner to output analog signals.

7. The sensor signal conditioner according to claim 6 which further includes a voltage regulator circuit for providing regulated voltages to the circuitry of the sensor signal conditioner.

8. The sensor signal conditioner according to claim 7 which further includes a power saving circuit and an oscillator.

9. The sensor signal conditioner according to claim 2 wherein the sensor signal conditioner is implemented as an integrated circuit.

10. The sensor signal conditioner according to claim 2 wherein the state machine is connected to the programmable memory and the interface circuit by dedicated connections.

11. The sensor signal conditioner according to claim 2 which further includes a transistor switch synchronized to the analog-to-digital converter.

12. The sensor signal conditioner according to claim 1 which further includes a power a transistor switching device for compatibility with relatively high voltage devices.

13. A method for calibrating a sensor signal conditioner, for a sensor having a predetermined sensing function, the conditioner comprising: an analog-to-digital converter for converting the analog output of the sensor to digital data; a state machine, coupled to the analog-to-digital converter, wherein the state machine comprises a math engine having an adder and a plurality of temporary storage registers; an interface circuit including both an analog interface and a digital serial interface, responsive to the state machine, for inputting and outputting data to the sensor signal conditioner; and a programmable memory, responsive to the state machine, for storing coefficient data for calibrating the sensor; the method comprising the steps, performed by the state machine, of:
   controlling a flow of digital data from the analog-to-digital converter; and
   placing the sensor signal conditioner into any one of the plurality of different predefined modes including a normal operation mode and a raw mode; and
   wherein:
       during the raw mode the state machine causes the output of the sensor to be output through the digital serial interface to a calibration host system which calculates calibration coefficients and writes the calibration coefficients to the programmable memory; and
       during the normal operation mode the state machine calculates calibrated output data from the calibration coefficients stored in the programmable memory and causes the calibrated data to be output through either the analog interface or the digital serial interface.

14. The method according to claim 13 wherein the sensors includes a bridge circuit and the sensor signal conditioner provides data which is calibrated for at least one of bridge offset, bridge gain, variation of bridge offset over temperature, variation of bridge gain over temperature or a second order effect.

15. The method according to claim 13 wherein the sensor signal conditioner is provided with temperature data and the signal sensor conditioner provides data which is calibrated for values related to both the bridge sensor and temperature.

16. The method according to claim 13 wherein the calibration host system generates an identification number associated with the data inputted from the sensor and outputs the identification number to the programmable memory of the sensor signal conditioner.

17. The method according to claim 16 wherein the calibration host system determines whether the sensor signal conditioner includes enough calibration points, and if there are an insufficient number of calibration points, additional calibration points are added.

18. The method according to claim 17 wherein the calibration host system calculates the coefficients after a sufficient number of calibration points have been added.

19. A sensor signal conditioner, for a bridge circuit sensor having a predetermined sensing function, comprising:
   an analog-to-digital converter for converting the analog output of the sensor to digital data;
   a state machine, coupled to the analog-to-digital converter, for controlling the flow of digital data from the analog-to-digital converter, and for placing the sensor signal conditioner into a plurality of different modes having a normal operation mode and a raw mode, wherein the state machine comprises a math engine having an adder and a plurality of temporary storage registers;

an interface circuit including both an analog interface and a digital serial interface, responsive to the state machine, for inputting and outputting data to the sensor signal conditioner; and a programmable memory, responsive to the state machine, for storing coefficient data for calibrating the sensor; and wherein:

during the raw mode the state machine causes the output of the sensor to be output through the digital serial interface to a calibration host system which calculates calibration coefficients and writes the calibration coefficients to the programmable memory; and during the normal mode the state machine calculates calibrated output data from the calibration coefficients stored in the programmable memory and causes the calibrated data to be output through either the analog interface or the digital serial interface, the calibrated output data being calibrated for at least one of bridge offset, bridge gain, variation of bridge offset over temperature, variation of bridge gain over temperature or a second-order effect.

20. A method for calibrating a sensor signal conditioner, for a bridge circuit sensor having a predetermined sensing function, the conditioner comprising: an analog-to-digital converter for converting the analog output of the sensor to digital data; a state machine, coupled to the analog-to-digital converter, wherein the state machine comprises a math engine having an adder and a plurality of temporary storage registers; an interface circuit including both an analog interface and a digital serial interface, responsive to the state machine, for inputting and outputting data to the sensor signal conditioner; and a programmable memory, responsive to the state machine, for storing coefficient data for calibrating the sensor; the method comprising the steps, performed by the state machine, of:

controlling a flow of digital data from the analog-to-digital converter; and placing the sensor signal conditioner into any one of the plurality of different predefined modes including a normal operation mode and a raw mode; and wherein:

during the raw mode the state machine causes the output of the sensor to be output through the digital serial interface to a calibration host system which calculates calibration coefficients and writes the calibration coefficients to the programmable memory; and during the normal operation mode the state machine calculates calibrated output data from the calibration coefficients stored in the programmable memory and causes the calibrated data to be output through either the analog interface or the digital serial interface, the calibrated output data being calibrated for at least one of bridge offset, bridge gain, variation of bridge offset over temperature, variation of bridge gain over temperature or a second-order effect.

* * * * *